US005780535A

United States Patent [19]
Ohashi et al.

[11] Patent Number: 5,780,535
[45] Date of Patent: Jul. 14, 1998

[54] RUBBER COMPOSITIONS FOR USE IN TIRE TREAD

[75] Inventors: Masayuki Ohashi; Eiji Nakamura, both of Kodaira, Japan

[73] Assignee: Bridgestone Corporation, Tokyo, Japan

[21] Appl. No.: 654,895

[22] Filed: May 29, 1996

[30] Foreign Application Priority Data

Jun. 6, 1995 [JP] Japan ................ 7-161523

[51] Int. Cl.$^6$ ................ C08J 5/49
[52] U.S. Cl. ................ 524/147; 524/297; 524/314; 524/315; 524/495; 524/526; 524/505
[58] Field of Search ................ 524/296, 505, 524/297, 147, 314, 315, 495, 526

[56] References Cited

U.S. PATENT DOCUMENTS

| 5,270,388 | 12/1993 | Onishi et al. ................ 525/89 |
| 5,552,483 | 9/1996 | Hergenrother et al. ................ 525/90 |

FOREIGN PATENT DOCUMENTS

| A 0 346 147 | 12/1989 | European Pat. Off. . |
| A 0 601 611 | 6/1994 | European Pat. Off. . |
| A 0 623 650 | 11/1994 | European Pat. Off. . |
| A 0 641 823 | 3/1995 | European Pat. Off. . |
| A 61218404 | 9/1986 | Japan . |
| A 63270751 | 11/1988 | Japan . |
| A 649248 | 1/1989 | Japan . |
| A 3239737 | 10/1991 | Japan . |
| A 3252431 | 11/1991 | Japan . |
| A 3252433 | 11/1991 | Japan . |
| A 551484 | 3/1993 | Japan . |
| A 5271477 | 10/1993 | Japan . |
| A 2331316 | 12/1993 | Japan . |
| A 747476 | 2/1995 | Japan . |

*Primary Examiner*—Peter D. Mulcahy
*Attorney, Agent, or Firm*—Sughrue, Mion, Zinn, Macpeak & Seas, PLLC

[57] ABSTRACT

A rubber composition for use in a tire tread comprises particular amounts of carbon black, silica, silane coupling agent and softening agent in addition to the specified diene rubber as a rubber ingredient and has specified storage modulus ratio after vulcanization and hystresis loss at 150% strain and provides pneumatic tires capable of stably developing the steering stability under wide-range service conditions of from low temperature to high temperature and from wet road surface to dry road surface.

5 Claims, 1 Drawing Sheet

FIG_1
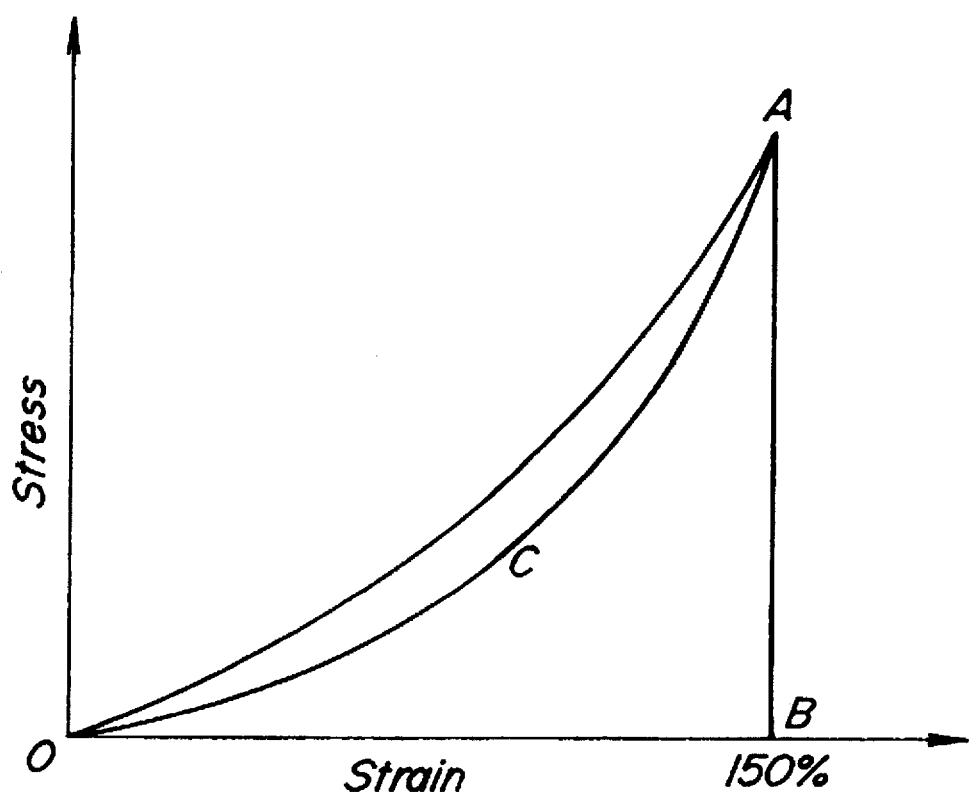

RUBBER COMPOSITIONS FOR USE IN TIRE TREAD

BACKGROUND OF THE INVENTION

1. Field of the Invention

This invention relates to rubber compositions for use in a tire tread, and more particularly to a rubber composition suitable for a tread of a passenger car radial tire stably developing an excellent steering stability over a temperature region ranging from a low temperature to a high temperature and on both wet and dry road surfaces.

2. Description of Related Art

There have hitherto been conducted various attempts for improving performances of the tire by compounding silica with a rubber composition for the tire.

For example, it is attempted to improve the wear resistance of the tire by using silica as a reinforcing agent in JP-A-61-218404.

Further, JP-A-63-270751 and JP-A-64-9248 disclose a rubber composition containing a given amount of silica for the provision of high running-performance tires.

And also, each of JP-A-3-239737, JP-A-3-252433 and JP-A-3-252431 discloses a pneumatic tire in which a rubber composition containing silica and a silane coupling agent together with a specified polymer is used in a tread of the tire for improving the wet skid resistance, rolling resistance and wear resistance.

Moreover, there are proposed the other rubber compositions containing silica for improving the tire performances (e.g. JP-A-4-224840, JP-A-5-271477, JP-A-5-51484, JP-A-7-47476, etc.).

In these conventional techniques, however, the compounding of silica with the rubber composition for the tread of the pneumatic tire simultaneously satisfies low fuel consumption (rolling resistance), wet skid resistance and wear resistance to a certain level, but is not used in the tread for high running-performance tires.

On the other hand, a silica-containing rubber composition capable of using in a tread for a wet racing tire is disclosed in JP-A-5-331316. Since this rubber composition is used for mainly running the racing tire under a strictly restricted wet condition over a short distance, if it is used in the tread for the high running-performance tire, the satisfactory results are obtained under various service conditions generally applied to the latter tire or under use conditions of long distance and long time.

In any case, the aforementioned conventional techniques are difficult to provide rubber compositions for use in the tire tread capable of stably developing the steering stability over a temperature region ranging from a low temperature to a high temperature and on both wet and dry road surfaces, particularly a tread rubber composition having improved braking property (wet skid resistance) on a wet road surface at a lower temperature relating to safeness at low temperature, and stability in the high-speed running (resistance to thermal sagging).

SUMMARY OF THE INVENTION

It is, therefore, an object of the invention to provide a novel rubber composition for use in a tire tread capable of stably developing a steering stability under wide-range use conditions of from a low temperature to a high temperature and from a wet road surface to a dry road surface.

The inventors have made various studies in order to solve the aforementioned problems and found that the above object can be achieved by using a rubber composition of the following construction and as a result the invention has been accomplished.

According to the invention, there is the provision of a rubber composition for use in a tire tread comprising 70–120 parts by weight in total of carbon black and silica and 35–70 parts by weight of a softening agent containing not more than 10 parts by weight of an ester plasticizer, based on 100 parts by weight of a diene rubber containing at least one emulsion-polymerized styrene-butadiene rubber and at least one solution-polymerized styrene-butadiene rubber with a blending ratio of emulsion-polymerized rubber to solution-polymerized rubber of 70/30–30/70 and having a total bound styrene content of 30–40% by weight and a total vinyl bond content of 15–25% by weight, in which an amount of silica based on the total amount of carbon black and silica is 20–80% by weight and a silane coupling agent is included in an amount corresponding to a total of 5–20% by weight of silica amount and 1–5% by weight of carbon black amount, and having a ratio of storage modulus at 100° C. to storage modulus at 30° C. after vulcanization of not less than 0.43 and a hysteresis loss at 150% strain of not less than 0.3.

In a preferable embodiment of the invention, carbon black has a cetyltrimethylammonium bromide adsorption (CTAB) of 115–160 m$^2$/g, a dibutyl phthalate oil absorption (DBP) of 115–150 cc/100 g and a tint value (TINT) of not less than 125.

In another preferable embodiment of the invention, silica has a primary particle size of not more than 10 nm.

Of course, the rubber composition according to the invention may properly compounded with additives usually used in rubber industry such as antioxidant, wax, vulcanizing agent, vulcanization accelerator, accelerator activator and the like.

BRIEF DESCRIPTION OF THE DRAWING

The invention will be described with reference to the accompanying drawing, wherein:

FIG. 1 is a graph showing a relationship between strain and stress for explaining hysteresis loss.

DESCRIPTION OF THE PREFERRED EMBODIMENTS

In the rubber composition for the tire tread according to the invention, the blending ratio of emulsion-polymerized styrene-butadiene rubber to solution-polymerized styrene-butadiene rubber is 70/30–30/70, preferably 70/30–40/60, more particularly 60/40–40/60. When the ratio of emulsion-polymerized rubber exceeds 70, the heat resistance lowers, while when the ratio of solution-polymerized rubber exceeds 70, the wear resistance and fracture properties are degraded.

In the blend of the emulsion-polymerized rubber and solution-polymerized rubber, the total bound styrene content is 30–40% by weight, preferably 35–40% by weight. When the total bound styrene content is less than 30% by weight, the sufficient gripping force on road surface is not obtained, while when it exceeds 40% by weight, the gripping force at a low temperature lowers. On the other hind, the total vinyl bond content is 15–25% by weight, preferably 16–21% by weight. When the total vinyl bond content is less than 15% by weight, thermal sagging is created at a high temperature and the steering stability is not stably obtained, while when it exceeds 25% by weight, the gripping force at a low temperature lowers.

In the rubber composition according to the invention, the total amount of carbon black and silica based on 100 parts by weight of the diene rubber is 70–120 parts by weight, preferably 80–110 parts by weight. When the total amount is less than 70 parts by weight, the sufficient gripping force on the road surface is not obtained, while when it exceeds 120 parts by weight, the wear resistance and heat resistance are considerably degraded. In this case, the amount of silica to the total amount of carbon black and silica is 20–80% by weight. When the amount of silica is less than 20% by weight, the sufficient wet skid resistance is not obtained at a low temperature, while when it exceeds 80% by weight, the gripping force on the dry road surface is not sufficiently obtained.

Furthermore, the amount of silane coupling agent is required to correspond to the total of 5–20% by weight of silica amount and 1–5% by weight of carbon black amount. When the amount of silane coupling agent is less than the above defined range, the sufficient reinforcing effect is not obtained, while when it exceeds this range, the modulus of elasticity is too large. The silane coupling agent is naturally a reinforcing agent for silica. However, the mixture of silica and carbon black is used in the rubber composition according to the invention, so that if the amount of silica is less, the silane coupling agent is adsorbed on the surface of carbon black to lose the effect of the silane coupling agent. For this end, it is required to add the silane coupling agent in an amount corresponding to 1–5% by weight of the carbon black amount.

Moreover, the silane coupling agent used may be represented by a general formula of $Y_3$—Si—$C_nH_{2n}$A (wherein Y is an alkyl or alkoxy group having a carbon number of 1–4 or a chlorine atom and may be same or different, and n is an integer of 1–6, and A is a group selected from the group consisting of —$S_mC_nH_{2n}$Si—$Y_3$ group, —X group and —SnZ group, in which X is a nitroso group, a mercapto group, an amino group, an epoxy group, a vinyl group, a chlorine atom or an imido group, and Z is

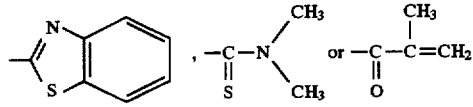

, and m is an integer of 1–6 and n and Y are the same as mentioned above).

As the silane coupling agent, mention may concretely be made of bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxy silane, 3-mercaptopropyltriethoxy silane, 2-mercaptoethyltrimethoxy silane, 2-mercaptoethyltriethoxy silane, 3-nitropropyltrimethoxy silane, 3-nitropropyltriethoxy silane, 3-chloropropyltrimethoxy silane, 3-chloropropyltriethoxy silane, 2-chloroethyltrimethoxy silane, 2-chloroethyltriethoxy silane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide and so on.

In the rubber composition according to the invention, the softening agent containing not more than 10 parts by weight of an ester plasticizer is compounded in an amount of 35–70 parts by weight, preferably 45–60 parts by weight. When the amount of the softening agent is less than 35 parts by weight, the sufficient gripping force on the road surface is not obtained, while when it exceeds 70 parts by weight or the amount of the ester plasticizer exceeds 10 parts by weight, the heat resistance and wear resistance are degraded. Moreover, the ester plasticizer includes trioctyl phosphate (TOP), dioctyl phthalate (DOP), dioctyl adipate (DOA), octyl oleate and the like.

Furthermore, the rubber composition according to the invention has a ratio of storage modulus (E') at 100° C. to storage modulus (E') at 30° C. after the vulcanization of not less than 0.43, preferably not less than 0.45. When the ratio is less than 0.43, the thermal sagging at high temperature and high speed becomes violent and the steering stability lowers.

Moreover, the rubber composition according to the invention has a hysteresis loss at 150% strain of not less than 0.3, preferably not less than 0.32. When the hysteresis loss is less than 0.3, the sufficient wet skid resistance at low temperature is not obtained.

The carbon black used in the rubber composition according to the invention is preferable to have the following properties.

That is, the cetyltrimethylammonium bromide adsorption (CTAB) is 115–160 m$^2$/g, preferably 135–150 m$^2$. When the value of CTAB is less than 115 m$^2$/g, the sufficient gripping force is not obtained, while when it exceeds 160 m$^2$/g, heat generation becomes large and the good dispersion of carbon black is not obtained and the fracture properties are degraded.

The dibutyl phthalate oil absorption (DBP) is 115–150 cc/100 g, preferably 125–140 cc/100 g. When the value of DBP is less than 115 cc/100 g, the sufficient wear resistance is not obtained, while when it exceeds 150 cc/100 g, the workability is degraded and the modulus of elasticity too rises and the resulting rubber composition is unsuitable for the tire tread.

The tint value (TINT) is not less than 125, preferably not less than 137. When the tint value is less than 125, the sufficient gripping force is not obtained and the wear resistance becomes insufficient.

The silica used in the rubber composition according to the invention is preferable to have a primary particle size of not more than 10 nm. In general, silica of VN 3 class has a primary particle size of about 12 nm. If the primary particle size becomes larger than the above value, the steering stability is degraded. When it is not more than 10 nm, the steering stability is improved.

The following examples are given in illustration of the invention and are not intended as limitations thereof.

Various rubber compositions are prepared according to a compounding recipe as shown in Tables 3 and 4. Moreover, SBRs A, B, C, D and E shown in Tables 3 and 4 are styrene-butadiene rubbers synthesized by a polymerization process as shown in Table 1 and having a bound styrene content (wt %) and a vinyl bond content (wt %) shown in Table 1, while BROL is a butadiene rubber made by Japan Synthetic Rubber Co., Ltd. and having properties shown in Table 1.

TABLE 1

|  | SBR | | | | | BR |
| --- | --- | --- | --- | --- | --- | --- |
|  | A | B | C | D | E | BR01 |
| Bound styrene content (wt %) | 35 | 45 | 35 | 27.5 | 25 | 0 |
| Vinyl bond content (wt %) | 12.35 | 10.45 | 26.00 | 25.4 | 9.75 | 2 |
| Polymerization process | emulsion polymerization | emulsion polymerization | solution polymerization | solution polymerization | solution polymerization | coordination polymerization |

The microstructure of butadiene portion in Table 1 is measured by an infrared absorption spectroscopy (Morero method). That is, the bound styrene content is determined by using a calibration curve measured from an absorption of phenyl group at 699 cm$^{-1}$ through the infrared absorption spectroscopy. On the other hand, the Morero method provides percentage by weight of vinyl bond when butadiene portion in SBR is 100, so that the vinyl bond content (wt %) shown in Table 1 is calculated as follows:

Vinyl bond content (wt %)={(100−bound styrene content (wt %))/100}×(vinyl bond wt % in butadiene portion obtained by Morero method)

Furthermore, carbon blacks A, B, C, D and E shown in Tables 3 and 4 have colloidal properties as shown in Table 2.

TABLE 2

|  | Carbon black | | | |
| --- | --- | --- | --- | --- |
|  | A | B | C | D |
| CATB (m$^2$/g) | 140 | 121 | 92 | 118 |
| DBP (cc/100 g) | 126 | 120 | 119 | 175 |
| TINT | 141 | 127 | 111 | 112 |

In Table 2, CTAB is measured according to ASTM D3765-89, and DBP is measured according to JIS K6221-1982, and TINT is measured according to JIS K6221-1982, respectively.

Moreover, silicas A and B shown in Tables 3 and 4 have the following primary particle size as measured through an electron microscope.

Silica A: 12 nm
Silica B: 9 nm

Then, a test tire having a tire size of 225/50R16 is manufactured by using the above rubber composition in a tread of the tire, which is mounted onto a rim of 8J-16 to evaluate properties of the rubber composition by the following test methods.

(a) Storage modulus (E')

A test specimen having a width of 5 mm, a thickness of 2 mm and a length of 20 mm is cut out from the tread and applied to a spectrometer made by Toyo Seiki Kabushiki Kaisha to measure storage module at 30° C. and 100° C. under conditions that an initial load is 150 g, a frequency is 50 Hz and a dynamic strain is 1%.

(b) Hystresis loss

A ring-shaped test specimen having an outer diameter of 29 mm, an inner diameter of 25 mm and a thickness of 2 mm is stretched up to an elongation of 150% at a temperature of 25° C.±1° C. by moving a grasped portion of the specimen at a rate of 300 mm/min to draw a stress-strain curve as shown in FIG. 1. After this procedure is repeated 6 times, the hystresis loss is measured according to the following equation with data of the sixth procedure. Moreover, the value of the hystresis loss is an average of three specimens.

Hystresis loss=(area OACO in FIG. 1)/(area OABO in FIG. 1)

(c) Gripping property on dry road surface

The test tire is actually run on a circuit course, during which lap time and feeling in the high-speed running (traction and braking performances, handling responsibility, gripping property on road surface in the steering and controllability after the excess beyond slipping limit) are evaluated totally. The value in the term "initial" is judged by average evaluation of 1–3 laps, while the value in the term "high temperature" is judged by average evaluation of 8–10 laps.

(d) Gripping property on wet road surface

The same feeling evaluation as made on the dry road surface is carried out after water is scattered on a test course to form a wet road surface. Further, a stopping distance through the braking at a speed of 80 km/h is measured. The gripping property on wet road surface is totally judged from these results. The value in the term "room temperature" is a result at 25° C., while the value in the term "low temperature" is a result at 0° C. in winter season.

The numerical values of the items (c) and (d) are represented by an index value on the basis that the tire of Comparative Example 1 is 100. The larger the index value, the better the result.

The measured results are also shown in Tables 3 and 4.

TABLE 3

|  |  |  | Example 1 | Example 2 | Example 3 | Example 4 | Example 5 |
| --- | --- | --- | --- | --- | --- | --- | --- |
| Compounding recipe (parts by weight) | SBR | A | 30 | 10 | 70 | 40 | 10 |
|  |  | B | 20 | 30 | — | 30 | 30 |
|  |  | C | 30 | 60 | 30 | 30 | 60 |
|  |  | D | 20 | — | — | — | — |
|  |  | E | — | — | — | — | — |
|  |  | BR01 | — | — | — | — | — |
|  | Carbon | A | 70 | 50 | 30 | — | 50 |

TABLE 3-continued

|  |  |  | Example 1 | Example 2 | Example 3 | Example 4 | Example 5 |
|---|---|---|---|---|---|---|---|
|  | black | B | — | — | — | 70 | — |
|  |  | C | — | — | — | — | — |
|  |  | D | — | — | — | — | — |
|  | Silica | A | 30 | 40 | 60 | 20 | — |
|  |  | B | — | — | — | — | 40 |
|  | Octyl oleate |  | 0 | 5 | 0 | 5 | 5 |
|  | Aromatic oil |  | 50 | 50 | 60 | 55 | 50 |
|  | Stearic acid |  | 1 | 1 | 1 | 1 | 1 |
|  | Antioxidant(6C)[1] |  | 1.5 | 1.5 | 1.5 | 1.5 | 1.5 |
|  | Wax |  | 2.0 | 2.0 | 2.0 | 2.0 | 2.0 |
|  | ZnO |  | 3.0 | 3.0 | 3.0 | 3.0 | 3.0 |
|  | Vulcanization | DM[2] | 0.6 | 0.8 | 0.8 | 0.6 | 0.8 |
|  | accelerator | DPB[3] | 0.3 | 0.5 | 0.5 | 0.3 | 0.5 |
|  |  | NS[4] | 2.3 | 2.8 | 2.8 | 1.0 | 2.8 |
|  | Sulfur |  | 1.3 | 1.6 | 1.8 | 1.8 | 1.6 |
|  | Silane coupling agent[5] |  | 3.2 | 4.1 | 6.5 | 2.3 | 6.2 |
| Emulsion-polymerized SBR/ solution-polymerized SBR |  |  | 50/50 | 40/60 | 70/30 | 70/30 | 40/60 |
| Bound styrene content (wt %) |  |  | 35.5 | 38.0 | 35.0 | 38.0 | 38.0 |
| Vinyl bond content (wt %) |  |  | 18.7 | 20.0 | 16.4 | 15.9 | 20.0 |
| Carbon black + silica |  |  | 100 | 90 | 90 | 90 | 90 |
| Silica/(carbon black + silica) |  |  | 30% | 44% | 67% | 22% | 44% |
| Amount range of silane coupling agent required[6] |  |  | 2.2–9.5 | 2.5–12.0 | 3.3–13.5 | 1.7–7.5 | 2.5–12.0 |
| E'(100° C.)/E'(30° C.) |  |  | 0.43 | 0.53 | 0.46 | 0.46 | 0.55 |
| Hysteresis loss |  |  | 0.40 | 0.32 | 0.31 | 0.39 | 0.33 |
| Dry road surface | initial |  | 103 | 100 | 97 | 98 | 103 |
|  | high temperature |  | 105 | 103 | 99 | 100 | 106 |
| Wet road surface | room temperature |  | 102 | 104 | 105 | 103 | 102 |
|  | low temperature |  | 105 | 106 | 107 | 105 | 103 |

TABLE 4

|  |  |  | Comparative Example 1 | Comparative Example 2 | Comparative Example 3 | Comparative Example 4 |
|---|---|---|---|---|---|---|
| Compounding recipe (parts by weight) | SBR | A | 35 | — | 10 | 70 |
|  |  | B | 30 | 75 | 30 | — |
|  |  | C | 35 | — | 60 | — |
|  |  | D | — | — | — | — |
|  |  | E | — | — | — | 30 |
|  | BR01 |  | — | 25 | — | — |
|  | Carbon black | A | 80 | — | — | — |
|  |  | B | — | 70 | — | 40 |
|  |  | C | — | — | — | — |
|  |  | D | — | — | 50 | — |
|  | Silica | A | — | 20 | 40 | 40 |
|  |  | B | — | — | — | — |
|  | Octyl oleate |  | 5 | 0 | 5 | 0 |
|  | Aromatic oil |  | 50 | 60 | 50 | 40 |
|  | Stearic acid |  | 1 | 1 | 1 | 1 |
|  | Antioxidant(6C)[1] |  | 1.5 | 1.5 | 1.5 | 1.5 |
|  | Wax |  | 2.0 | 2.0 | 2.0 | 2.0 |
|  | ZnO |  | 3.0 | 3.0 | 3.0 | 3.0 |
|  | Vulcanization | DM[2] | 0.6 | 0.7 | 0.8 | 0.7 |
|  | accelerator | DPB[3] | 0.3 | 0.6 | 0.5 | 0.6 |
|  |  | NS[4] | 2.3 | 0.4 | 2.8 | 1.0 |
|  | Sulfur |  | 1.9 | 1.6 | 1.6 | 1.0 |
|  | Silane coupling agent[5] |  | — | 2.0 | 4.1 | 8.0 |
| Emulsion-polymerized SBR/ solution-polymerized SBR |  |  | 65/35 | 100/0 | 40/60 | 70/30 |
| Bound styrene content (wt %) |  |  | 38.0 | 33.8 | 38.0 | 32.0 |
| Vinyl bond content (wt %) |  |  | 16.6 | 8.3 | 20.0 | 11.6 |
| Carbon black + silica |  |  | 80 | 90 | 90 | 80 |
| Silica/(carbon black + silica) |  |  | 0% | 22% | 44% | 50% |
| Amount range of silane coupling agent required[6] |  |  | 0.8–4.0 | 1.7–7.5 | 2.5–12.0 | 2.4–10.0 |
| E'(100° C.)/E'(30° C.) |  |  | 0.41 | 0.48 | 0.50 | 0.42 |
| Hysteresis loss |  |  | 0.36 | 0.36 | 0.29 | 0.27 |
| Dry road surface | initial |  | 100 | 97 | 97 | 90 |
|  | high temperature |  | 100 | 97 | 100 | 88 |

TABLE 4-continued

|  |  | Comparative Example 1 | Comparative Example 2 | Comparative Example 3 | Comparative Example 4 |
|---|---|---|---|---|---|
| Wet road surface | room temperature | 100 | 97 | 100 | 90 |
|  | low temperature | 100 | 98 | 100 | 90 |

[1] N-(1,3-dimethylbutyl)-N'-phenyl-p-phenylenediamine
[2] dibenzothiazylsulfide
[3] diphenylguanidine
[4] N-test-butyl-2-benzothiazolyl sulfenamide
[5] bis(3-triethoxysilylpropyl) tetrasulfide
[6] amount range of silane coupling agent required when 5–20% weight of silica is combined with 1–5% by weight of carbon black As mentioned above, the rubber composition for use in the tire tread according to the invention comprises particular amounts of carbon black, silica, silane coupling agent and softening agent in addition to the specified diene rubber as a rubber ingredient and has a ratio $E'(100°\,C.)/E'(30°\,C.)$ of not less than 0.43 and a hystresis loss at 150% strain of not less than 0.3, from which there are provided pneumatic tires capable of stably developing the steering stability under wide-range service conditions of from low temperature to high temperature and from wet road surface to dry road surface, particularly tires having excellent braking property on wet road surface at low temperature (wet skid resistance) and stability in the high-speed running (resistance to thermal sagging).

What is claimed is:

1. A rubber composition for use in a tire tread comprising 70–120 parts by weight in total of carbon black and silica and 35–70 parts by weight of a softening agent containing not more than 10 parts by weight of an ester plasticizer, based on 100 parts by weight of a diene rubber containing at least one emulsion-polymerized styrene-butadiene rubber and at least one solution-polymerized styrene-butadiene rubber with a blending ratio of emulsion-polymerized rubber to solution-polymerized rubber of 70/30–30/70 and having a total bound styrene content of 30–40% by weight and a total vinyl bond content of 15–25% by weight, in which an amount of silica based on the total amount of carbon black and silica is 20–80% by weight and a silane coupling agent is included in an amount corresponding to a total of 5–20% by weight of silica amount and 1–5% by weight of carbon black amount, and having a ratio of storage modulus at 100° C. to storage modulus at 30° C. after vulcanization of not less than 0.43 and a hysteresis loss at 150% strain of not less than 0.3.

2. A rubber composition according to claim 1, wherein said carbon black has a cetyltrimethylammonium bromide adsorption of 115–160 m²/g, a dibutyl phthalate oil absorption of 115–150 cc/100 g and a tint value of not less than 125.

3. A rubber composition according to claim 1, wherein said silica has a primary particle size of not more than 10 nm.

4. A rubber composition-according to claim 1, wherein said silane coupling agent is represented by a general formula of $Y_3$—Si—$C_nH_{2n}$A (wherein Y is an alkyl or alkoxy group having a carbon number of 1–4 or a chlorine atom and may be same or different, and n is an integer of 1–6, and A is a group selected from the group consisting of —$S_mC_nH_{2n}$Si—$Y_3$ group, —X group and —SnZ group, in which X is a nitroso group, a mercapto group, an amino group, an epoxy group, a vinyl group, a chlorine atom or an imido group, and Z is

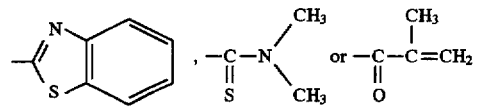

, and m is an integer of 1–6 and n and Y are the same as mentioned above).

5. A rubber composition according to claim 1, wherein said ester plasticizer is trioctyl phosphate, dioctyl phthalate, dioctyl adipate or octyl oleate.

* * * * *